(12) United States Patent
Weston et al.

(10) Patent No.: US 12,529,589 B2
(45) Date of Patent: Jan. 20, 2026

(54) METHODS AND APPARATUS TO DETECT LOADS LOST FROM VEHICLES DURING TRANSIT

(71) Applicant: Ford Global Technologies, LLC, Dearborn, MI (US)

(72) Inventors: Keith Weston, Canton, MI (US); Eliza Rose Bifano, Garden City, MI (US); David Michael Russell, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 547 days.

(21) Appl. No.: 17/947,908

(22) Filed: Sep. 19, 2022

(65) Prior Publication Data
US 2024/0094046 A1 Mar. 21, 2024

(51) Int. Cl.
*G01G 19/12* (2006.01)
*B60R 25/10* (2013.01)
(Continued)

(52) U.S. Cl.
CPC ............. *G01G 19/12* (2013.01); *B60R 25/10* (2013.01); *G01G 23/38* (2013.01);
(Continued)

(58) Field of Classification Search
CPC .... G01G 19/12; G01G 23/38; G01G 23/3742; G01G 23/3735; G01G 19/64;
(Continued)

(56) References Cited

U.S. PATENT DOCUMENTS

| | | | |
|---|---|---|---|
| 5,410,109 A | 4/1995 | Tarter et al. | |
| 5,603,556 A * | 2/1997 | Klink | G01G 19/042 303/22.7 |

(Continued)

FOREIGN PATENT DOCUMENTS

| | | |
|---|---|---|
| CN | 201787411 U | 4/2011 |
| CN | 109537419 A | 3/2019 |

(Continued)

OTHER PUBLICATIONS

United States Patent and Trademark Office, "Notice of Allowance and Fee(s) Due," issued in connection with U.S. Appl. No. 17/845,557, dated Jul. 1, 2025, 9 pages.

(Continued)

*Primary Examiner* — Randy W Gibson
(74) *Attorney, Agent, or Firm* — Lorne Forsythe; Hanley, Flight and Zimmerman, LLC

(57) ABSTRACT

Methods and apparatus to identify loads lost from vehicles are disclosed. An example apparatus to identify a load lost from a vehicle includes at least one memory, machine readable instructions, and processor circuitry to at least one of instantiate or execute the machine readable instructions to determine a first load carried by the vehicle at a first time, determine a second load carried by the vehicle at a second time after the first time, identify a lost load occurrence in response to a load difference between the first load and the second load satisfying a lost load threshold, and generate an alert indicative of the lost load occurrence.

18 Claims, 6 Drawing Sheets

(51) Int. Cl.
*G01G 19/64* (2006.01)
*G01G 23/38* (2006.01)
*G01D 3/08* (2006.01)
*G01D 21/02* (2006.01)
*G01G 23/37* (2006.01)
*G06Q 10/083* (2023.01)

(52) U.S. Cl.
CPC ........ *B60R 2025/1016* (2013.01); *G01D 3/08* (2013.01); *G01D 21/02* (2013.01); *G01G 19/64* (2013.01); *G01G 23/3735* (2013.01); *G01G 23/3742* (2013.01); *G06Q 10/083* (2013.01)

(58) Field of Classification Search
CPC G01G 19/08; B60R 25/10; B60R 2025/1016; G01D 21/02; G01D 3/08; G06Q 10/083
See application file for complete search history.

(56) References Cited

U.S. PATENT DOCUMENTS

| | | | |
|---|---|---|---|
| 5,817,989 A * | 10/1998 | Shimizu | G01G 19/08 |
| | | | 177/136 |
| 5,877,455 A * | 3/1999 | Kyrtsos | G01G 19/035 |
| | | | 177/136 |
| 6,037,550 A | 3/2000 | Bradley | |
| 6,384,349 B1 * | 5/2002 | Voll | G01G 19/42 |
| | | | 177/137 |
| 7,009,118 B2 | 3/2006 | Pottebaum et al. | |
| 7,594,441 B2 * | 9/2009 | Gudat | G01S 13/04 |
| | | | 73/146 |
| 7,864,066 B2 | 1/2011 | Kriel et al. | |
| 9,605,994 B2 * | 3/2017 | Jensen | G01G 19/64 |
| 2005/0219042 A1 * | 10/2005 | Thomson | B60R 25/1004 |
| | | | 340/666 |
| 2009/0084173 A1 | 4/2009 | Gudat et al. | |
| 2012/0127310 A1 | 5/2012 | Kim | |
| 2015/0362358 A1 * | 12/2015 | Jensen | G06Q 10/06393 |
| | | | 414/21 |
| 2016/0221591 A1 * | 8/2016 | Kuehbandner | B61L 1/165 |
| 2019/0335100 A1 | 10/2019 | Chen | |
| 2021/0127310 A1 | 4/2021 | Lee | |
| 2021/0291832 A1 | 9/2021 | Simmons | |
| 2021/0387637 A1 | 12/2021 | Rogers et al. | |
| 2022/0113182 A1 * | 4/2022 | Henry | G08C 17/02 |
| 2023/0122725 A1 * | 4/2023 | Frea | G06T 7/62 |
| | | | 177/163 |
| 2023/0215183 A1 | 7/2023 | Bahramgiri | |
| 2024/0034116 A1 | 2/2024 | Coombs | |

FOREIGN PATENT DOCUMENTS

| | | |
|---|---|---|
| JP | 2011209251 A | 10/2011 |
| JP | 5429565 B2 | 2/2014 |

OTHER PUBLICATIONS

United States Patent and Trademark Office, "Non-Final Office Action," issued in connection with U.S. Appl. No. 17/845,557, dated Feb. 21, 2025, 25 pages.

* cited by examiner

METHODS AND APPARATUS TO DETECT LOADS LOST FROM VEHICLES DURING TRANSIT

FIELD OF THE DISCLOSURE

This disclosure relates generally to vehicle load transport and, more particularly, to methods and apparatus to detect lost loads.

BACKGROUND

Vehicles are often used to transport loads to a destination. In some instances, loads can become lost, and it may not be immediately discernable.

SUMMARY

An example apparatus disclosed herein includes at least one memory, machine readable instructions, and processor circuitry to at least one of instantiate or execute the machine readable instructions to determine a first load carried by the vehicle at a first time, determine a second load carried by the vehicle at a second time after the first time, identify a lost load occurrence in response to a load difference between the first load and the second load satisfying a lost load threshold, and generate an alert indicative of the lost load occurrence.

An example vehicle disclosed herein includes at least one of pressure sensors associated with a suspension assembly or ride height sensors, and processor circuitry to execute instructions to determine a first load carried by the vehicle at a first time based on first signals from at least one of the pressure sensors or the ride height sensors, determine a second load carried by the vehicle at a second time later than the first time based on second signals from at least one of the pressure sensors or the ride height sensors, and cause a lost load alert to be presented to an operator of the vehicle in response to the second load being less than the first load by at least a lost load threshold.

An example method disclosed herein includes determining a difference in a load carried by a first vehicle at a first time and a second time, detecting a lost load occurrence associated with the first vehicle in response to the difference satisfying a threshold, and causing a lost load alert to be presented in the first vehicle.

BRIEF DESCRIPTION OF THE DRAWINGS

In general, the same reference numbers will be used throughout the drawing(s) and accompanying written description to refer to the same or like parts. The figures are not to scale.

Figure 1:
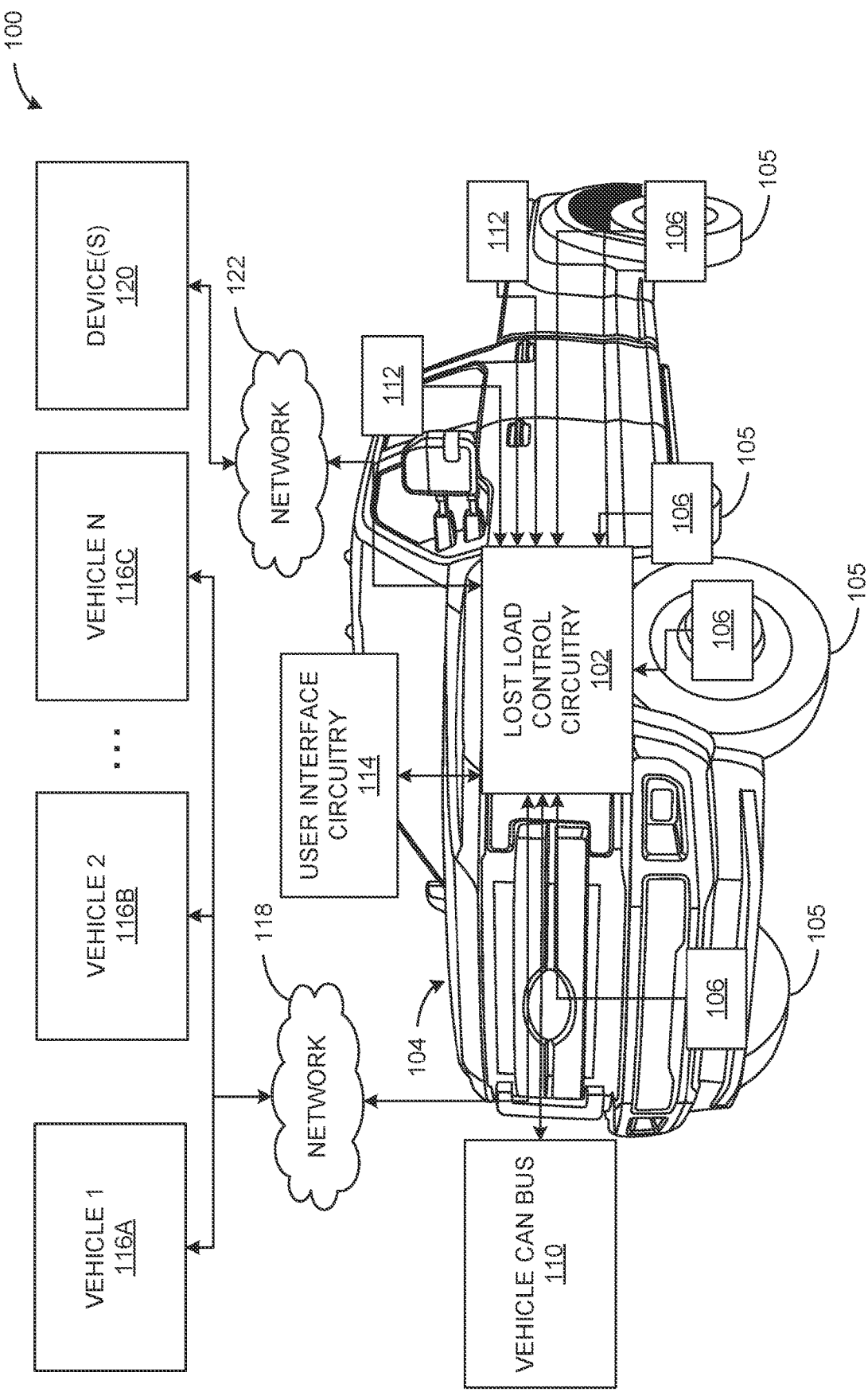
FIG. 1 illustrates an example environment in which teachings disclosed herein may be implemented.

As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of; other parts therebetween, without other parts therebetween, with the first and second parts touching, or without the first and second parts being in direct contact with one another.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified in the below description.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmable with instructions to perform specific operations and including one or more semiconductor-based logic devices (e.g., electrical hardware implemented by one or more transistors). Examples of processor circuitry include programmable microprocessors, Field Programmable Gate Arrays (FPGAs) that may instantiate instructions. Central Processor Units (CPUs), Graphics Processor Units (GPUs). Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of processor circuitry is/are best suited to execute the computing task(s).

DETAILED DESCRIPTION

Disclosed herein are example methods and apparatus to detect loads lost from vehicles. Examples disclosed herein provide a system to detect lost loads based on ride height information (e.g., from ride height sensors) and/or pressure information (e.g., from pressure sensors) associated with a suspension assembly. Specifically, the system can determine a load (e.g., a weight) carried by the vehicle based on signals from the ride height sensors and/or the pressure sensors. As a result, examples disclosed herein detect the loss of a load based on the load encountered by a base of vehicle support to account for any movement or shift of the load. Because ride height sensors and/or pressure sensors are often utilized in vehicles to help control the vehicle suspension, the ride height sensors and/or the pressure sensors enable the lost load to be detected absent any additional hardware specifically dedicated to lost load detection.

In addition to the ride height data and/or the pressure data, the system can consider certain factors, such as vehicle characteristics, driving behavior, the external conditions (e.g., environmental factors), driving surface information, and/or other factors, to obtain accurate and robust load information throughout the life of the vehicle. Such examples utilize on-board vehicle sensors (e.g., tire pressure sensors, steering angle sensors, sensors in an anti-lock braking (ABS) system, etc.) to adjust the relationship between ride height and weight and/or calculations of load information. In some examples disclosed herein, the calculations of the load information are continuously adjusted based on driving behavior. For example, when a driver frequently drives on off-road driving surfaces, the calculation is adjusted to weigh compensation factors related to driving surface conditions (e.g., contact grade, contact roll, local bump or pitfall, etc.) more heavily.

An example vehicle disclosed herein includes processor circuitry to determine a first load carried by the vehicle at a first time based on first signals from the ride height sensors and/or the pressure sensors. Further, the processor circuitry determines a second load carried by the vehicle at a second time later than the first time based on second signals from the ride height sensors and/or the pressure sensors. In some examples disclosed herein, the first time and/or the second time occurs in response to gross body motion data associated with the vehicle being within a predetermined gross body motion data range. Specifically, the predetermined gross body motion data range can include an acceleration range, a riding surface pitch range, and/or a vehicle heading range. In some examples, the processor circuitry triggers a determination of the second load in response to the vehicle having an acceleration within a threshold range of the acceleration encountered at the first time and/or a steering angle within a threshold range of the steering angle encountered at the first time. Accordingly, examples disclosed herein help prevent driving conditions from affecting a difference between the first load and the second load.

Examples disclosed herein identify a lost load occurrence in response to a load difference between the first load and the second load satisfying a lost load threshold. In some examples disclosed herein, the processor circuitry defines the lost load threshold as a certain weight (e.g., 5 pounds (lbs.), 50 lbs., 100 lbs., etc.). In some disclosed examples, the processor circuitry can determine the lost load threshold based on characteristics associated with the vehicle. For example, the processor circuitry can define the lost load threshold as a percentage of a mass of the vehicle (e.g., 0.5% of a vehicle mass, 1.0% of the vehicle mass, 3.0% of the vehicle mass, etc.). In some examples disclosed herein, the processor circuitry defines the lost load threshold as a rate of change in the load carried by the vehicle over time (e.g., a loss of 5.0 lbs./second (sec.), 10.0 lbs./sec., 50 lbs./sec., etc.).

Examples disclosed herein generate an alert indicative of the lost load occurrence in response to identifying the lost load occurrence. For example, the processor circuitry can cause an audible, visual, and/or haptic indication of the lost load occurrence to be presented in the vehicle. In some disclosed examples, the processor circuitry guides the vehicle to a predetermined location where the operator can readjust the load and/or purchase supplies to secure the load. For example, the predetermined location can be a store, a gas station, a police station, a rest stop, a parking lot, and/or any other location where the operator is safe to observe and/or readjust the load.

In some examples disclosed herein, the processor circuitry can identify a material of the lost load. For example, the processor circuitry can access data from one or more cameras to determine a geometry associated with an item that was lost by the vehicle. In some examples disclosed herein, the processor circuitry determines whether the vehicle has been purposely unloaded based on the camera data. Additionally, the processor circuitry can determine whether rain, sleet, or snow is accumulating in an area of the vehicle associated with the load, in which case the processor circuitry can adjust the lost load threshold accordingly.

Examples disclosed herein determine an area in which the load was lost. For example, the processor circuitry can identify an area traversed by the vehicle between the first time and the second time. In some disclosed examples, when the processor circuitry has determined another load difference(s) before the lost load occurrence (e.g., between the first time and the second time), the processor circuitry defines a lost load location range as the traversed area between the second time and a third time corresponding to a load determination instance in which the processor circuitry determined a difference between the initial load and the detected load did not satisfy (e.g., was less than) the lost load threshold. In some disclosed examples, the third time is defined by the load determination performed temporally closest to the second time in advance of the lost load occurrence. As such, the processor circuitry can flag the area in which the load was lost as a lost load location. In some disclosed examples, the processor circuitry generates an indication of the lost load location for the operator of the vehicle. For example, the processor circuitry can identify the lost load location on a map presented on a display of the vehicle.

Further, examples disclosed herein can utilize vehicle-to-vehicle (V2V) communication to inform other vehicles of the lost load occurrence. In some disclosed examples, the processor circuitry indicates the lost load location to the other vehicles. For example, the processor circuitry can indicate the lost load location to an associated vehicle (e.g., a vehicle in a same fleet as the vehicle, a vehicle operated under a same organization as the vehicle, etc.) with a request for the associated vehicle to recover the lost load. In some disclosed examples, the processor circuitry selectively informs other vehicles about the lost load occurrence based on a location and/or a heading of the other vehicles. Additionally or alternatively, the processor circuitry can inform authorities of the lost load location via vehicle-to-everything (V2X) communication. For example, the processor circuitry can cause the authorities to be informed in response to the lost load satisfying a size threshold.

FIG. 1 illustrates an environment 100 in which example lost load control circuitry 102 can be utilized with an example vehicle 104. The vehicle 104 includes one or more example wheel and suspension assemblies 105, example sensors 106, an example vehicle controller area network (CAN) bus 110, and example cameras 112. In some examples, the lost load control circuitry 102 can output information to example user interface circuitry 114 (e.g., a speaker, a display, a human-machine interface, etc.) in the vehicle 104. In some examples, the lost load control circuitry 102 outputs information to and/or receives information from other example vehicles 116A, 116B, 116C via an example vehicle-to-vehicle (V2V) network 118 (e.g., a vehicular ad hoc network (VANET), a dedicated short range communications (DSRC) channel, etc.). In some examples, the lost load control circuitry 102 outputs information to and/or receives information from external device(s) 120 via a remote condition monitoring (RCM) network 122 (e.g., an Internet of Things (IoT) network). In the illustrated example, the vehicle 104 is a consumer automobile. In other examples, the vehicle 104 can be a commercial truck, a motorcycle, a motorized cart, an all-terrain vehicle, a bus, a motorized scooter, a locomotive, or any other vehicle.

In some examples, one or more of the wheel and suspension assemblies 105 can be coupled via an axle (e.g., a front axle, a rear axle, etc.). In some examples, the sensors 106 are ride height sensors that measure the compression of specific ones of the wheel and suspension assemblies 105 (e.g., a deflection of an elastic element of the wheel and suspension assembly 105), from which the lost load control circuitry 102 can derive load information (e.g., a load being carried by the vehicle 104, axle weight data, etc.). For example, the sensors 106 can be rotary suspension height sensors and/or linear shock sensors. In some examples, the sensors 106 are pressure sensors associated with pneumatic control of the wheel and suspension assemblies 105, from which the lost load control circuitry 102 can derive the load information.

In the illustrated example, the vehicle CAN bus 110 obtains data from systems of the vehicle 104 and transmits the data to the lost load control circuitry 102. For example, the vehicle CAN bus 110 can transmit tire pressure data, steering angle data, wheel speed data, temperature data, engine output data, light detection and ranging (LIDAR) data, and/or data from any system of the vehicle 104 (e.g., powertrain, anti-lock braking system, etc.). In some examples, the vehicle CAN bus 110 is in communication with other sensors that obtain data associated with the vehicle 104.

In some examples, the lost load control circuitry 102 adjusts a relationship between a load being carried by the vehicle 104 and the ride height data and/or the pressure data obtained from the sensors 106 based on data received from the vehicle CAN bus 110. Additionally, the lost load control circuitry 102 identifies times when an accurate load can be calculated based on the data received from the vehicle CAN bus 110. For example, the lost load control circuitry 102 can read the signals from the sensors 106 and determine the load being carried by the vehicle 104 in response to the vehicle CAN bus 110 indicating that the vehicle 104 is on a surface that has a pitch within a predetermined riding surface pitch range (e.g., a relatively flat surface), has an acceleration within a predetermined acceleration range, and/or has a steering angle or heading within a predetermined steering angle or heading range. Accordingly, the lost load control circuitry 102 can ignore readings from the sensors 106 in response to the data from the vehicle CAN bus 110 being outside a predetermined range to avoid an erroneous load determination.

In some examples, the lost load control circuitry 102 utilizes signals obtained from the external device(s) 120 via the RCM network 122 when stopped (e.g., at a stop sign, at a traffic light, etc.) to account for the road not being flat at an encountered location. For example, the signals from the external device(s) 120 can be indicative of an expected distribution of the load given a pitch of the road encountered by the vehicle 104. In some examples, the external device(s) 120 help determine the pitch and/or a roll encountered by the vehicle 104. In turn, the lost load control circuitry 102 can utilize the signals to determine respective weights (e.g., influence values) to be applied to the signals from the sensors 106 to determine the load being carried by the vehicle 104.

The example lost load control circuitry 102 enables detection of a loss in a load being carried by the vehicle 104. For example, the lost load control circuitry 102 can receive first signals from the sensors 106 at a first time during which the vehicle 104 is carrying one or more items (e.g., a haul of materials, supplies, products, etc.). The example lost load control circuitry 102 can process the signals to determine a first load (e.g., an initial load) being carried by the vehicle 104. Further, the lost load control circuitry 102 can receive second signals from the sensors 106 and process the second signals to determine a second load being carried by the vehicle 104 at that respective time. In the illustrated example, the lost load control circuitry 102 can compare the second load to the first load to identify whether a weight of the item(s) being carried by the vehicle 104 has changed. In response to the second load being less than the first load by at least a lost load threshold, the lost load control circuitry 102 can determine one or more of the item(s) carried by the vehicle 104 has been lost (e.g., is no longer being carried by the vehicle 104). In some examples, the lost load control circuitry 102 determines the lost load threshold based on characteristics of the vehicle 104 and/or a weight of the first load. For example, the lost load threshold can correspond to a percentage of a vehicle weight and/or the weight of the first load.

In the illustrated example, the lost load control circuitry 102 can generate an alert indicative of a lost load occurrence. In some examples, the lost load control circuitry 102 causes the alert to be visually presented in the vehicle 104 via the user interface circuitry 114 (e.g., via a display). In some examples, the lost load control circuitry 102 causes the alert to be audibly presented in the vehicle 104 via the user interface circuitry 114 (e.g., via a speaker). In some examples, the lost load control circuitry 102 causes the alert to be haptically presented in the vehicle 104 by the user interface circuitry 114 (e.g., via a seat vibration and/or a steering wheel vibration). In some examples, the lost load control circuitry 102 causes a lost load alert to be transmitted to the external device(s) 120 via the network 122. In such examples, the external device(s) 120 are associated with a commercial fleet operator, authorities, and/or any other individual(s) associated with the vehicle 104 or the load.

In the illustrated example, the cameras 112 include a rear camera, side cameras, and/or a vehicle 360° camera mounted on the vehicle 104. The cameras 112 can transmit data to the lost load control circuitry 102. In some examples, the lost load control circuitry 102 determines there is a leak underneath the vehicle 104 based on the data received from the cameras 112. In such examples, the lost load control circuitry 102 can generate an alert indicative of the lost load being caused by a leak and cause the alert to be presented in the vehicle 104 via the user interface circuitry 114. In some examples, the lost load control circuitry 102 determines there is snow or rainwater accumulating on the vehicle 104 based on the data from cameras 112. In such examples, the lost load control circuitry 102 can adjust the lost load threshold to account for the increased load and/or increased load variance caused by the conditions.

In the illustrated example, the lost load control circuitry 102 can alert the other vehicles 116& 116B, 116O of the lost load occurrence via the V2V network 118. In some examples, the external device(s) 120 directs one or more of the other vehicles 116A, 116B, 116C to the area in which the load was lost to enable the lost load to be recovered.

Figure 2:
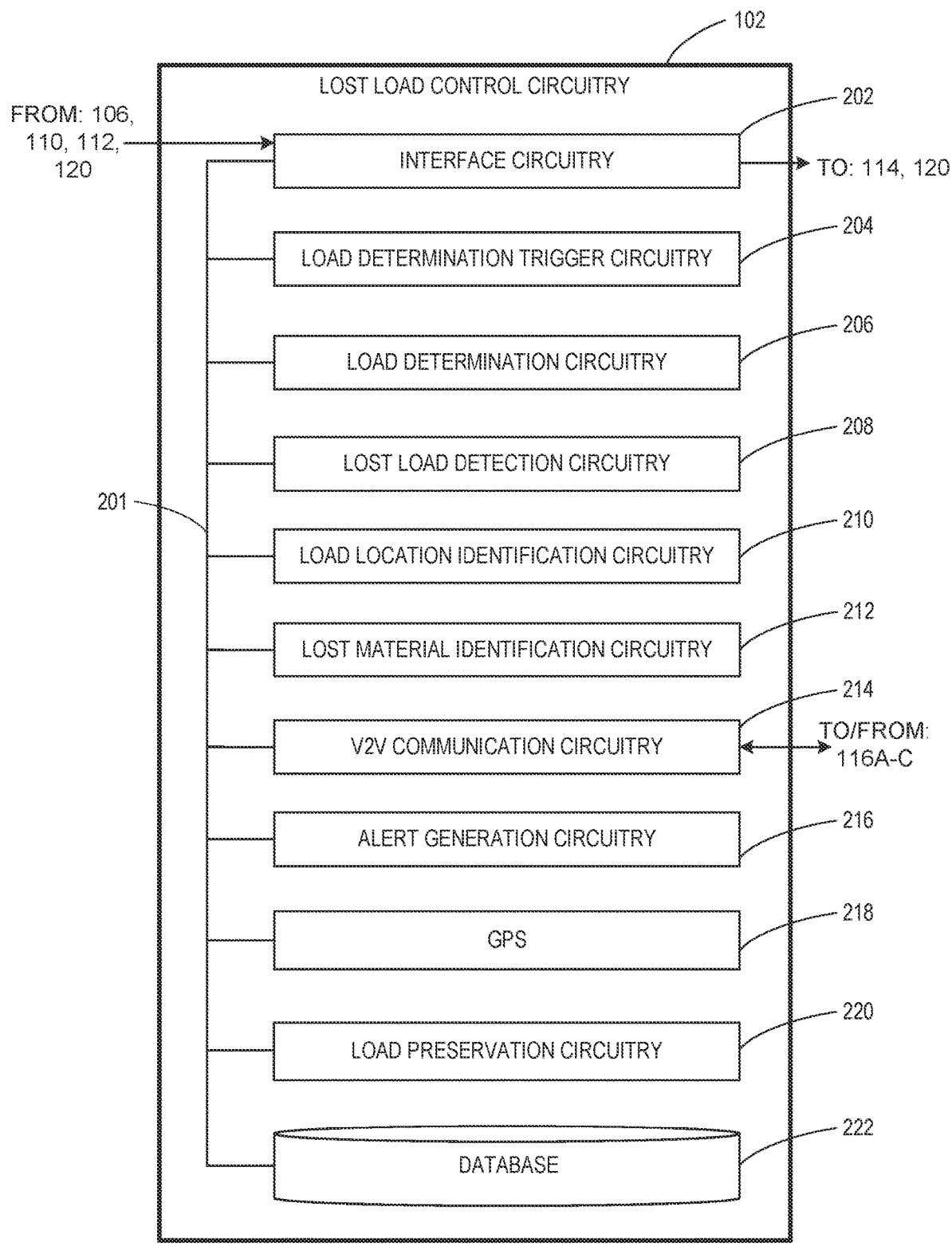
FIG. 2 is a block diagram of example lost load control circuitry of the environment of FIG. 1.

FIG. 2 is a block diagram of the lost load control circuitry 102 of FIG. 1 to detect whether the vehicle 104 has lost cargo. The lost load control circuitry 102 of FIG. 2 may be instantiated (e.g., creating an instance of, bring into being for any length of time, materialize, implement, etc.) by processor circuitry such as a central processing unit executing instructions. Additionally or alternatively, the lost load control circuitry 102 of FIG. 2 may be instantiated (e.g., creating an instance of, bring into being for any length of time, materialize, implement, etc.) by an ASIC or an FPGA structured to perform operations corresponding to the instructions. It should be understood that some or all of the lost load control circuitry 102 of FIG. 2 may, thus, be instantiated at the same or different times. Some or all of the circuitry may be instantiated, for example, in one or more threads executing concurrently on hardware and/or in series on hardware. Moreover, in some examples, some or all of the lost load control circuitry 102 of FIG. 2 may be implemented by microprocessor circuitry executing instructions to implement one or more virtual machines and/or containers.

The lost load control circuitry 102 of FIG. 2 includes an example bus 201, example interface circuitry 202, example load determination trigger circuitry 204, example load determination circuitry 206, example lost load detection circuitry 208, example load location identification circuitry 210, example lost material identification circuitry 212, example V2V communication circuitry 214, example alert generation circuitry 216, an example global positioning system (GPS) 218, example load preservation circuitry 220, and an example database 222. In the illustrated example of FIG. 2, the interface circuitry 202, the load determination trigger circuitry 204, the load determination circuitry 206, the lost load detection circuitry 208, the load location identification circuitry 210, the lost material identification circuitry 212, the V2V communication circuitry 214, the alert generation circuitry 216, the GPS 218, the load preservation circuitry 220, and the database 222 are in communication with the bus 201. In some examples, the bus 201 can be implemented with bus circuitry, bus software, and/or bus firmware. For example, the bus 201 can be implemented by at least one of an Inter-Integrated Circuit (I2C) bus, a Serial Peripheral Interface (SPI) bus, a Peripheral Component Interconnect (PCI) bus, or a Peripheral Component Interconnect Express (PCIe or PCIE) bus. Additionally or alternatively, the bus 201 can be implemented by any other type of computing or electrical bus.

The lost load control circuitry 102 of FIG. 2 includes the interface circuitry 202 to receive and/or transmit data. In some examples, the interface circuitry 202 receives data, such as load data, via the sensors 106. In some examples, the interface circuitry 202 receives data, such as gross body motion data, steering angle data, acceleration data, and/or other data associated with the vehicle 104, via the vehicle CAN bus 110. In some examples, the interface circuitry 202 receives data, such as cargo depiction data, lost structure depiction data, and/or data associated with a depiction of vehicle surroundings, via the cameras 112. In some examples, the interface circuitry 202 receives data, such as data indicative of a lost load being found, from the vehicles 116A, 116B, 116C via the V2V network 118. In some examples, the interface circuitry 202 receives data, such as data indicative of a weight distribution associated with an encountered road pitch, via the external device(s) 120 via the RCM network 122. In some examples, the interface circuitry 202 transmits data, such as lost load alert data, to the user interface circuitry 114. In some examples, the interface circuitry 202 transmits data, such as lost load location and/or structure data, to the vehicles 116A, 116B, 116C and/or the user interface circuitry 114. In some examples, the interface circuitry 202 transmits data, such as location data, to the external device(s) 120 via the RCM network 122. In some examples, the interface circuitry 202 is instantiated by processor circuitry executing interface instructions and/or configured to perform operations such as those represented by the flowchart of FIG. 3.

The lost load control circuitry 102 of FIG. 2 includes the load determination trigger circuitry 204 to determine when encountered driving conditions enable an accurate determination of a load being carried by the vehicle 104. For example, the load determination trigger circuitry 204 can trigger a load determination in response to gross body motion data associated with the vehicle 104 being within a predetermined gross body motion data range. In some examples, the load determination trigger circuitry 204 triggers the load determination in response to the vehicle 104 being in gear (e.g., having a gear setting that enables movement of the vehicle 104). In some examples, the load determination trigger circuitry 204 triggers the load determination in response to the vehicle encountering a riding surface pitch within a predetermined riding surface pitch range. In some examples, the load determination trigger circuitry 204 triggers the load determination in response to the vehicle 104 having an acceleration that satisfies (e.g., is less than or equal to) an acceleration threshold. For example, the load determination trigger circuitry 204 can trigger the load determination in response to the vehicle 104 having an acceleration of approximately zero. In some examples, the load determination trigger circuitry 204 triggers the load determination in response to the vehicle 104 having a heading or steering angle within a threshold heading or steering angle range. For example, the load determination trigger circuitry 204 can trigger the load determination in response to the vehicle 104 having a substantially straight steering angle. As used herein, a "substantially straight steering angle" encompasses a straight steering angle and more broadly encompasses a meaning whereby the vehicle 104 has a steering angle within five degrees (5°) of a straight steering angle. In the illustrated example, the load determination trigger circuitry 204 transmits a signal to the load determination circuitry 204 to cause the load determination circuitry 204 to determine the load being carried by the vehicle 104.

In some examples, the load determination trigger circuitry 204 expands one or more of the aforementioned thresholds and/or ranges in response to the vehicle 104 encountering certain conditions. For example, after a steering angle of the vehicle 104 has exceeded a predetermined steering angle (e.g., a 25° steering angle, a 40° steering angle, etc.), the load determination trigger circuitry 204 can expand the predetermined gross body motion data range, increase the acceleration threshold, and/or expand the threshold heading or steering angle range. Thus, the load determination trigger circuitry 204 can enable the lost load control circuitry 102 to detect whether any portion of the load has been lost soon after the condition that caused the adjustment to the threshold(s) such that an operator can address the lost load, or the load still being carried by the vehicle 104, soon after the lost load occurrence. In such examples, the load determination trigger circuitry 204 can transmit a signal indicative of the adjustments to the predetermined threshold(s) and/or range(s) to the lost load determination circuitry 206 and/or the lost load detection circuitry 208 such that the lost load determination circuitry 206 and/or the lost load detection circuitry 208 can adjust load calculations and/or a threshold associated with lost load detection, respectively. In some examples, the load determination trigger circuitry 204 is instantiated by processor circuitry executing load determination trigger instructions and/or configured to perform operations such as those represented by the flowchart of FIG. 3.

The lost load control circuitry 102 of FIG. 2 includes the load determination circuitry 206 to determine the load being carried by the vehicle 104. In some examples, the load determination circuitry 206 determines the load in response to being triggered by the load determination trigger circuitry 204. The load determination circuitry 206 determines the load being carried by the vehicle 104 based on data from the sensors 106. Specifically, the load determination circuitry 206 can determine the load being carried by the vehicle 104 based on ride height data and/or pressure data from the sensors 106. In some examples, the load determination circuitry 206 determines certain weights (e.g., influence factors) to be applied to the data from the sensors 106 in the load determination based on the data from the vehicle CAN bus 110 and/or the external device(s) 120. For example, the load determination circuitry 206 can determine the weights to be applied to the data from the sensors 106 based on driving surface data, steering angle data, parking brake data, fuel level data, tire pressure data, environmental condition data, vehicle lifecycle data, and/or load sharing data associated with an axle, anti-roll bar, and/or tie rod link of the wheel and suspension assemblies 105. The load determination circuitry 206 can indicate the determined load to the lost load detection circuitry 208.

The lost load control circuitry 102 of FIG. 2 includes the lost load detection circuitry 208 to determine whether any portion of a load being carried by the vehicle 104 has been lost. In some examples, the lost load detection circuitry 208 determines a lost load threshold based on an initial load being carried by the vehicle 104. Additionally, the lost load detection circuitry 208 can determine the lost load threshold based on characteristics associated with the vehicle stored in the database 222. Specifically, the lost load threshold defines a load reduction in the load being carried by the vehicle 104 that qualifies as a load being lost by the vehicle 104. In some examples, the lost load threshold is defined as a weight. In some examples, the lost load threshold is defined as a change in weight over time. In some examples, the lost load detection circuitry 208 adjusts the lost load threshold based on the environmental condition data. For example, the lost load detection circuitry 208 can adjust the lost load threshold in response to the data from the cameras 112 indicating that rain or snow is accumulating on the vehicle 104. In some examples, the lost load detection circuitry 208 adjusts the lost load threshold based on driving conditions.

When the load determination circuitry 206 determines the load being carried by the vehicle 104 after determining the initial load, the lost load detection circuitry 208 determines a load difference between the load and the determined initial load. In turn, the lost load detection circuitry 208 can determine whether the load difference satisfies (e.g., is greater than or equal to) the lost load threshold. In response to the load difference satisfying the lost load threshold, the lost load detection circuitry 208 identifies a lost load occurrence. In turn, the lost load detection circuitry 208 can transmit a signal indicative of the lost load occurrence to the load location identification circuitry 210, the lost material identification circuitry 212, the V2V communication circuitry 214, the alert generation circuitry 216, and/or the load preservation circuitry 220. In some examples, in response to the load difference not satisfying the lost load threshold, the lost load detection circuitry 208 determines a location of the vehicle 104 via the GPS 218 and stores an indication of the load of the vehicle 104 being maintained (e.g., not being lost) when the vehicle 104 was at the determined location. In such examples, the lost load detection circuitry 208 stores the load difference with the indication in case some load difference is identified. For example, a small load difference could be indicative of a start of a leak but may not be significant enough to be flagged. Additionally, in such examples, the lost load detection circuitry 208 stores a timestamp with the indication of the load difference and the location. In some examples, the lost load detection circuitry 208 is instantiated by processor circuitry executing lost load detection instructions and/or configured to perform operations such as those represented by the flowchart of FIG. 3.

The lost load control circuitry 102 of FIG. 2 includes the load location identification circuitry 210 to determine a location or area in which the load was lost in response to the lost load detection circuitry 208 identifying the lost load occurrence. In response to receiving the signal indicative of the lost load occurrence, the load location identification circuitry 210 can identify a location of the vehicle 104 via the GPS 218. Further, the load location identification circuitry 210 can identify the most recently stored location in the database 222, which is indicative of a location where the lost load detection circuitry 208 determined a lost load occurrence had not occurred. In some examples, the load location identification circuitry 210 tracks a path of the vehicle 104 after each load determination. As a result, the load location identification circuitry 210 can determine an area that the vehicle 104 traversed between a first time when the load had not yet been lost and a second time when the lost load occurrence was identified. Accordingly, the load location identification circuitry 210 can determine the load was lost in the area traversed between the first time and the second time. In turn, the load location identification circuitry 210 can indicate the lost load area to the V2V communication circuitry 214, the alert generation circuitry 216, and/or the load preservation circuitry 220.

In some examples, the load location identification circuitry 210 identifies an area and/or time where a leak was initially identified based on the load differences and associated locations and timestamps stored in the database 222. In some examples, the load location identification circuitry 210 causes the load determination circuitry 206 to determine a rate at which a leak is occurring based on the data in the database 222. In some examples, the load location identification circuitry 210 is instantiated by processor circuitry executing load location identification instructions and/or configured to perform operations such as those represented by the flowchart of FIG. 3.

The lost load control circuitry 102 of FIG. 2 includes the lost material identification circuitry 212 to determine a structure or state of matter lost in response to the lost load detection circuitry 208 identifying the lost load occurrence. For example, the lost material identification circuitry 212 can determine the structure lost based on the data from the cameras 112. In some examples, the lost material identification circuitry 212 determines a size and/or a shape of the structure based on the data from the cameras 112. In some examples, the lost material identification circuitry 212 determines the lost load is associated with a fluid leak in response to the data from the cameras 112 being indicative of dripping or a stream from underneath the vehicle 104. In the illustrated example, the lost material identification circuitry 212 transmits a signal indicative of the lost material to the V2V communication circuitry 214, the alert generation circuitry 216, and/or the load preservation circuitry 220. In some examples, the lost material identification circuitry 212 is instantiated by processor circuitry executing lost material identification instructions and/or configured to perform operations such as those represented by the flowchart of FIG. 3.

The lost load control circuitry 102 of FIG. 2 includes the V2V communication circuitry 214 to communicate with the other vehicles 116A, 116B, 116C. In the illustrated example, the V2V communication circuitry 214 can cause transmission of a lost load alert to the other vehicles 116A, 116B, 116C in response to the lost load detection circuitry 208 identifying the lost load occurrence. In some examples, the V2V communication circuitry 214 indicates the lost load area in the lost load alert. In such examples, the V2V communication circuitry 214 can cause the lost load alert to be received by one or more of the vehicles 116A, 116B, 116C in response to the vehicles 116A, 116B, 116C being within a threshold proximity (e.g., 1 mile, 2 miles, 5 miles, etc.) of the lost load area.

In some examples, the V2V communication circuitry 214 indicates data associated with the structure lost in the lost load alert. In some examples, the V2V communication circuitry 214 causes the vehicles 116A, 116B, 116C to look for the lost structure. In such examples, in response to identifying the structure in the lost load area, the vehicles 116A, 116B, 116C can transmit a signal to the V2V communication circuitry 214 indicative of a precise location of the identified structure. In such examples, the V2V communication circuitry 214 can indicate the precise location of the identified structure to the alert generation circuitry 216. In some examples, the V2V communication circuitry 214 is instantiated by processor circuitry executing V2V communication instructions and/or configured to perform operations such as those represented by the flowchart of FIG. 3.

The lost load control circuitry 102 of FIG. 2 includes the alert generation circuitry 216 to generate an alert indicative of the lost load occurrence. In some examples, the alert generation circuitry 216 causes the alert to be presented via the user interface circuitry 114. In some examples, the alert generation circuitry 216 includes characteristics associated with the lost load in the alert. For example, the alert generation circuitry 216 can cause the lost load area and/or a material of the lost load to be indicated via the user interface circuitry 114. In some examples, in response to the vehicles 116A, 116B, 116C finding the lost load, the alert generation circuitry 216 causes the precise location of the lost load to be indicated via the user interface circuitry 114. In some examples, the alert generation circuitry 216 is instantiated by processor circuitry executing alert generation instructions and/or configured to perform operations such as those represented by the flowchart of FIG. 3.

The lost load control circuitry 102 of FIG. 2 includes the load preservation circuitry 220 to determine one or more destinations where the load being carried by the vehicle 104 can be resecured by the vehicle operator. In some examples, the load preservation circuitry 220 can identify nearby stores, gas stations, police stations, rest stops, parking lots, and/or any other location where the operator is safe to observe and/or readjust the load via the GPS 218. In such examples, the load preservation circuitry 220 can cause a route to the nearby location to be presented to the vehicle operator via the user interface circuitry 114. In some examples, the load preservation circuitry 220 causes a route to the lost load area to be presented to the vehicle operator via the user interface circuitry 114. In some examples, the load preservation circuitry 220 activates hazard lights and/or limits an engine output in response to detection of the lost load occurrence. In some examples, the load preservation circuitry 220 is instantiated by processor circuitry executing load preservation instructions and/or configured to perform operations such as those represented by the flowchart of FIG. 3.

While an example manner of implementing the lost load control circuitry 102 of FIG. 1 is illustrated in FIG. 2, one or more of the elements, processes, and/or devices illustrated in FIG. 2 may be combined, divided, re-arranged, omitted, eliminated, and/or implemented in any other way. Further, the example interface circuitry 202, the example load determination trigger circuitry 204, the example load determination circuitry 206, the example lost load detection circuitry 208, the example load location identification circuitry 210, the example lost material identification circuitry 212, the example V2V communication circuitry 214, the example alert generation circuitry 216, the example GPS 218, the example load preservation circuitry 220, the example database 222, and/or, more generally, the example lost load control circuitry 102 of FIGS. 1 and 2, may be implemented by hardware alone or by hardware in combination with software and/or firmware. Thus, for example, any of the example interface circuitry 202, the example load determination trigger circuitry 204, the example load determination circuitry 206, the example lost load detection circuitry 208, the example load location identification circuitry 210, the example lost material identification circuitry 212, the example V2V communication circuitry 214, the example alert generation circuitry 216, the example GPS 218, the example load preservation circuitry 220, the example database 222, and/or, more generally, the example lost load control circuitry 102, could be implemented by processor circuitry, analog circuit(s), digital circuit(s), logic circuit(s), programmable processor(s), programmable micro controller(s), graphics processing unit(s) (GPU(s)), digital signal processor(s) (DSP(s)), application specific integrated circuit(s) (ASIC(s)), programmable logic device(s) (PLD(s)), and/or field programmable logic device(s)

(FPLD(s)) such as Field Programmable Gate Arrays (FPGAs). Further still, the example lost load control circuitry 102 of FIGS. 1 and 2 may include one or more elements, processes, and/or devices in addition to, or instead of, those illustrated in FIG. 2, and/or may include more than one of any or all of the illustrated elements, processes and devices.

Figure 3:
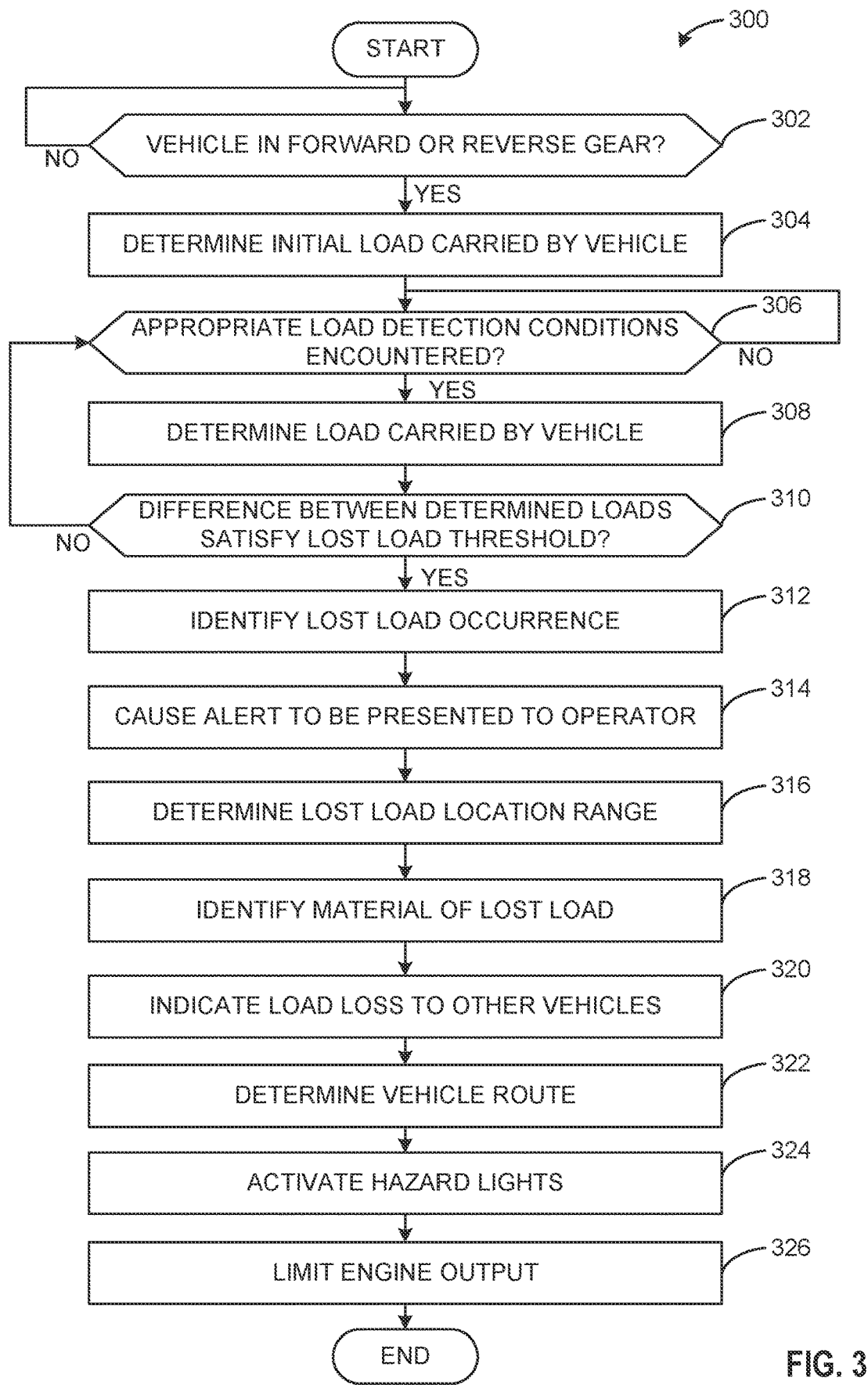
FIG. 3 is a flowchart representative of example machine readable instructions and/or example operations that may be executed by example processor circuitry to implement the lost load control circuitry of FIG. 2.

A flowchart representative of example machine readable instructions, which may be executed to configure processor circuitry to implement the lost load control circuitry 102 of FIGS. 1 and 2, is shown in FIG. 3. The machine readable instructions may be one or more executable programs or portion(s) of an executable program for execution by processor circuitry, such as the processor circuitry 412 shown in the example processor platform 400 discussed below in connection with FIG. 4 and/or the example processor circuitry discussed below in connection with FIGS. 5 and/or 6. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowchart illustrated in FIG. 3, many other methods of implementing the example lost load control circuitry 102 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU, an XPU, etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, Cl, Perl, Python, JavaScript, HyperText Markup Language (HTML), Structured Query Language (SQL), Swift, etc.

As mentioned above, the example operations of FIG. 3 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium, non-transitory computer readable storage medium, non-transitory machine readable medium, and non-transitory machine readable storage medium are expressly defined to include any type of computer readable storage device and/or storage disk and to exclude propagating signals and to exclude transmission media. As used herein, the terms "computer readable storage device" and "machine readable storage device" are defined to include any physical (mechanical and/or electrical) structure to store information, but to exclude propagating signals and to exclude transmission media. Examples of computer readable storage devices and machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer readable instructions, machine readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A. (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B. or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B. or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 3 is a flowchart representative of example machine readable instructions and/or example operations 300 that may be executed and/or instantiated by processor circuitry to detect a loss of material from a vehicle. The machine readable instructions and/or the operations 300 of FIG. 3 begin at block 302, at which the lost load control circuitry 102 determines whether a gear of the vehicle 104 has been shifted. For example, the interface circuitry 202 can receive data indicative of the gear of the vehicle 104 being moved out of a park gear.

At block 304, the lost load control circuitry 102 determines a first load being carried by the vehicle 104. For example, the load determination circuitry 204 determines the first load (e.g., an initial load) being carried by the vehicle 104 at a first time based on ride height data and/or pressure data from the sensors 106. Additionally, the load determination circuitry 204 can determine the first load based on data from the vehicle CAN bus 110 and/or the external device(s) 120. In some examples, the load determination circuitry 204 determines the first load in response to being triggered by the load determination trigger circuitry 204.

At block 306, the lost load control circuitry 102 determines whether appropriate load detection conditions have been encountered. For example, the load determination trigger circuitry 204 can determine whether certain conditions have been encountered at a second time subsequent to the first time. In some examples, the load determination trigger circuitry 204 determines appropriate load detection conditions have been encountered based on gross body motion data associated with the vehicle 104, an acceleration of the vehicle 104, a steering angle or heading of the vehicle 104, and/or a riding surface pitch encountered by the vehicle 104. In response to determining that appropriate load detection conditions have been encountered, the operations 300 proceed to block 308. Otherwise, the operations 300 repeat block 306 and wait for appropriate load detection conditions to be encountered.

At block 308, the lost load control circuitry 102 determines a load (e.g., a second load) being carried by the vehicle 104 subsequent to the determination of the initial load. For example, the load determination circuitry 206 can determine the second load being carried by the vehicle 104 based on data from the sensors 106, the vehicle CAN bus 110, and/or the external device(s) 120 in response to the load determination trigger circuitry 204 determining appropriate load detection conditions have been encountered.

At block 310, the lost load control circuitry 102 determines whether a difference between the determined loads satisfies a lost load threshold. For example, the lost load detection circuitry 208 can determine a load difference between the first load and the second load. In turn, the lost load detection circuitry 208 can compare the load difference to the lost load threshold. In some examples, the lost load detection circuitry 208 configures the lost load threshold based on characteristics of the vehicle 104 stored in the database 222, data from the vehicle CAN bus 110, and/or data from the external device(s) 120. In some examples, the lost load detection circuitry 208 stores the load difference, a timestamp associated with the load determination, and/or a location associated with the load determination obtained via the GPS 218 in the database 222. In response to the lost load detection circuitry determining the load difference satisfies (e.g., is greater than or equal to) the lost load threshold, the operations 300 proceed to block 312. Otherwise, the operations 300 return to block 306 as the lost load control circuitry 102 determines the initial load is still being carried by the vehicle 104 and continues to monitor the vehicle load.

At block 312, the lost load control circuitry 102 identifies a lost load occurrence. For example, the lost load detection circuitry 208 can flag a lost load occurrence in response to the load difference between the initial load and a subsequent load satisfying the lost load threshold.

At block 314, the lost load control circuitry 102 causes an alert to be presented to an operator of the vehicle 104 (e.g., a driver). For example, the alert generation circuitry 216 can cause a lost load alert (e.g., a lost load indication) to be audibly, visually, and/or haptically rendered in the vehicle 104 via the user interface circuitry 114. In some examples, the alert generation circuitry 216 causes transmission of a lost load alert to the external device(s) 120.

At block 316, the lost load control circuitry 102 determines a lost load location range. For example, the load location identification circuitry 210 can determine the lost load location range based on a location of the vehicle at the time of the lost load occurrence and data associated with previous load determinations. In some examples, the load location identification circuitry 210 identifies a most recent load determination before detection of the lost load occurrence in the database 222 and extracts an associated location. In such examples, the load location identification circuitry 210 can determine the lost load location range is between the location associated with detection of the lost load occurrence and the location associated with the most recent load determination before the detection of the lost load occurrence. In some examples, the load location identification circuitry 210 pinpoints a precise location associated with the lost load occurrence based on data from the vehicles 116A, 116B, 1160. In some examples, the load location identification circuitry 210 renders the lost load location range to the operator of the vehicle 104 via the user interface circuitry 114. Further, the load location identification circuitry 210 can cause the user interface circuitry 114 to prompt the operator to indicate whether they prefer to be routed to the lost load location range (e.g., to find and retrieve the lost load). In some examples, in response to the operator indicating a preference to be routed to the lost load location range, the load location identification circuitry 210 can cause the GPS 218 to generate a route to return the vehicle 104 to the lost load location. In such examples, the load location identification circuitry 210 renders the route generated by the GPS 218 to the operator of the vehicle 104 via the user interface circuitry 114. In some examples, the load location identification circuitry 210 causes transmission of a signal indicative of the lost load location to the external device(s) 120. In some examples, the external devices) 120 directs one or more of the other vehicles 116A, 116B, 1160 to the lost load location range to enable the lost load to be recovered.

At block 318, the lost load control circuitry 102 the lost load control circuitry 102 identifies a material of the lost load. For example, the lost material identification circuitry 212 can identify characteristics associated with the lost load (e.g., a size, a shape, a state of matter, etc.) based on data from the cameras 112. In some examples, the lost material identification circuitry 212 causes the user interface circuitry 114 to render the characteristics associated with the lost load to the operator. In some examples, the lost material identification circuitry 212 indicates the characteristics associated with the lost load to the V2V communication circuitry 214.

At block 320, the lost load control circuitry 102 transmits a signal indicative of the lost load occurrence to the other vehicles 116A, 116B, 116C. For example, the V2V communication circuitry 214 can broadcast a signal indicative of the lost load occurrence as well as the determined location and/or material associated with the lost load to the other vehicles 116A. 116B, 1160 via the V2V network 118. In some examples, one or more of the other vehicles 116A, 116B, 116C identifies the lost load in their route and, in turn, communicates the precise location of the lost load to the V2V communication circuitry 214 via the V2V network 118. In such examples, the V2V communication circuitry 214 indicates the precise location of the lost load to the load location identification circuitry 210. As such, the load location identification circuitry 210 can update the lost load location transmitted to the operator of the vehicle 104 and/or to the external device(s) 120 based on the precise location identified by one or more of the vehicles 116A, 116B. 116C.

At block 322, the lost load control circuitry 102 determines a route for the vehicle 104 to follow. For example, the load preservation circuitry 220 can route the vehicle 104 to a predetermined store, a gas station, a police stations, a rest stop, a parking lot, and/or any other location where the operator is able to observe and/or readjust the load. In some examples, the load location identification circuitry 210 routes the vehicle 104 to the lost load location. For example, the load location identification circuitry 210 can cause the GPS 218 to generate a route to return the vehicle 104 to the location at which the lost load was detected or another location of the lost load received from another vehicle 116A, 116B, 1160.

At block 324, the lost load control circuitry 102 may activate (e.g., turns on) hazard lights associated with the vehicle 104. At block 326, the lost load control circuitry 102 limits an engine output of the vehicle 104.

Figure 4:
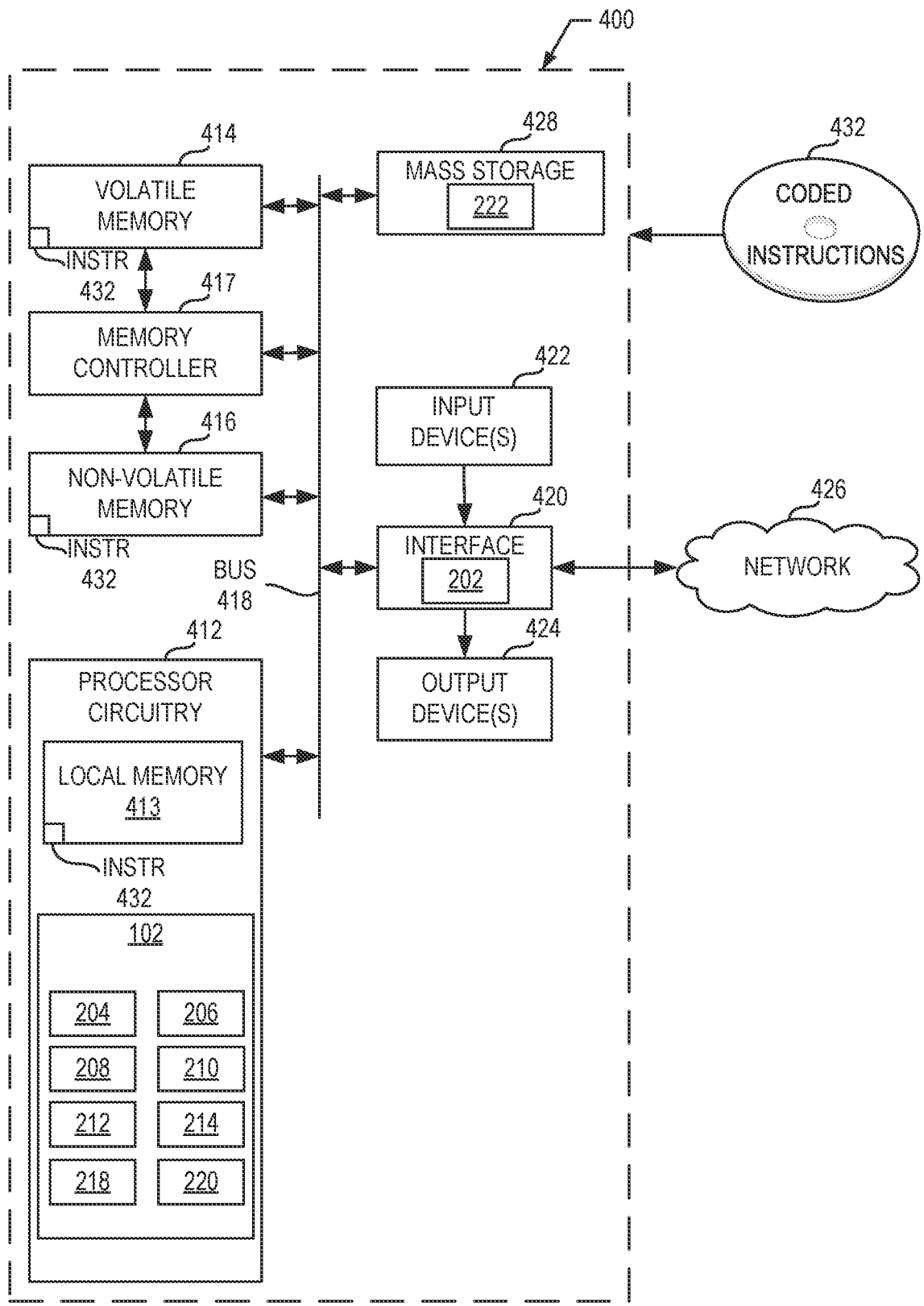
FIG. 4 is a block diagram of an example processing platform including processor circuitry structured to execute the example machine readable instructions and/or the example operations of FIG. 3 to implement the lost load control circuitry of FIG. 2.

FIG. 4 is a block diagram of an example processor platform 400 structured to execute and/or instantiate the machine readable instructions and/or the operations of FIG. 3 to implement the lost load control circuitry 102 of FIGS. 1 and 2. The processor platform 400 can be, for example, an automotive electronic control unit (ECU) or any other type of computing device.

The processor platform 400 of the illustrated example includes processor circuitry 412. The processor circuitry 412 of the illustrated example is hardware. For example, the processor circuitry 412 can be implemented by one or more integrated circuits, logic circuits, FPGAs, microprocessors, CPUs, GPUs, DSPs, and/or microcontrollers from any desired family or manufacturer. The processor circuitry 412 may be implemented by one or more semiconductor based (e.g., silicon based) devices. In this example, the processor circuitry 412 implements the load determination trigger circuitry 204, the load determination circuitry 206, the lost load detection circuitry 208, the load location identification circuitry 210, the lost material identification circuitry 212, the V2V communication circuitry 214, the alert generation circuitry 216, the GPS 218, and/or the load preservation circuitry 220.

The processor circuitry 412 of the illustrated example includes a local memory 413 (e.g., a cache, registers, etc.). The processor circuitry 412 of the illustrated example is in communication with a main memory including a volatile memory 414 and a non-volatile memory 416 by a bus 418. The volatile memory 414 may be implemented by Synchronous Dynamic Random Access Memory (SDRAM), Dynamic Random Access Memory (DRAM), RAMBUS® Dynamic Random Access Memory (RDRAM), and/or any other type of RAM device. The non-volatile memory 416 may be implemented by flash memory and/or any other desired type of memory device. Access to the main memory 414, 416 of the illustrated example is controlled by a memory controller 417.

The processor platform 400 of the illustrated example also includes interface circuitry 420. The interface circuitry 420 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 422 are connected to the interface circuitry 420. The input device(s) 422 permit(s) a user to enter data and/or commands into the processor circuitry 412. The input device(s) 422 can be implemented by, for example, vehicle sensors and/or systems as well as external vehicles and/or devices. In some examples, the input device(s) 422 implement, or are in communication with, the sensors 106, the vehicle CAN bus 110, the cameras 112, the vehicles 116A, 116B, 116C, and/or the external device(s) 120.

One or more output devices 424 are also connected to the interface circuitry 420 of the illustrated example. The output device(s) 424 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a speaker, and/or other vehicle control systems. The interface circuitry 420 of the illustrated example, thus, typically includes a graphics driver card, a graphics driver chip, and/or graphics processor circuitry such as a GPU.

The interface circuitry 420 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 426. The communication can be by, for example, an Ethernet connection, a digital subscriber line (DSL) connection, a telephone line connection, a coaxial cable system, a satellite system, a line-of-site wireless system, a cellular telephone system, an optical connection, etc. In this example, the interface circuitry 420 implements the interface circuitry 202 of FIG. 2.

The processor platform 40) of the illustrated example also includes one or more mass storage devices 428 to store software and/or data. Examples of such mass storage devices 428 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives. In this example, the mass storage devices 428 implement the database 222.

The machine readable instructions 432, which may be implemented by the machine readable instructions of FIG. 3, may be stored in the mass storage device 428, in the volatile memory 414, in the non-volatile memory 416, and/or on a removable non-transitory computer readable storage medium such as a CD or DVD.

Figure 5:
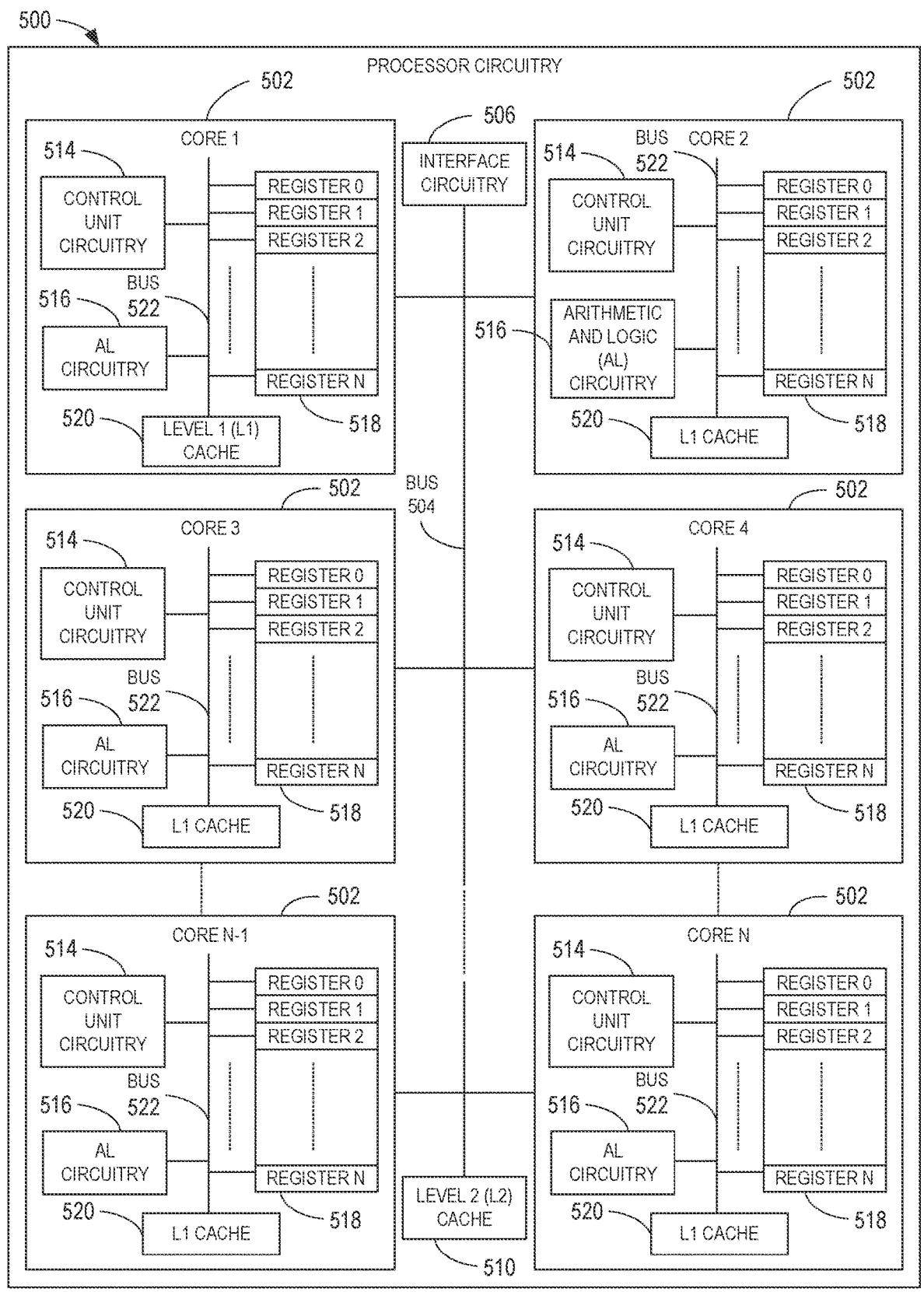
FIG. 5 is a block diagram of an example implementation of the processor circuitry of FIG. 4.

FIG. 5 is a block diagram of an example implementation of the processor circuitry 412 of FIG. 4. In this example, the processor circuitry 412 of FIG. 4 is implemented by a microprocessor 500. For example, the microprocessor 500 may be a general purpose microprocessor (e.g., general purpose microprocessor circuitry). The microprocessor 500 executes some or all of the machine readable instructions of the flowchart of FIG. 3 to effectively instantiate the lost load control circuitry 102 of FIGS. 1 and 2 as logic circuits to perform the operations corresponding to those machine readable instructions. In some such examples, the lost load control circuitry 102 of FIGS. 1 and 2 is instantiated by the hardware circuits of the microprocessor 500 in combination with the instructions. For example, the microprocessor 500 may be implemented by multi-core hardware circuitry such as a CPU, a DSP, a GPU, an XPU, etc. Although it may include any number of example cores 502 (e.g., 1 core), the microprocessor 500 of this example is a multi-core semiconductor device including N cores. The cores 502 of the microprocessor 500 may operate independently or may cooperate to execute machine readable instructions. For example, machine code corresponding to a firmware program, an embedded software program, or a software program may be executed by one of the cores 502 or may be executed by multiple ones of the cores 502 at the same or different times. In some examples, the machine code corresponding to the firmware program, the embedded software program, or the software program is split into threads and executed in parallel by two or more of the cores 502. The software program may correspond to a portion or all of the machine readable instructions and/or operations represented by the flowchart of FIG. 3.

The cores 502 may communicate by a first example bus 504. In some examples, the first bus 504 may be implemented by a communication bus to effectuate communication associated with one(s) of the cores 502. For example, the first bus 504 may be implemented by at least one of an Inter-Integrated Circuit (I2C) bus, a Serial Peripheral Interface (SPI) bus, a PCI bus, or a PCIe bus. Additionally or alternatively, the first bus 504 may be implemented by any other type of computing or electrical bus. The cores 502 may obtain data, instructions, and/or signals from one or more external devices by example interface circuitry 506. The cores 502 may output data, instructions, and/or signals to the one or more external devices by the interface circuitry 506. Although the cores 502 of this example include example local memory 520 (e.g., Level 1 (L1) cache that may be split into an L 1 data cache and an L 1 instruction cache), the microprocessor 500 also includes example shared memory 510 that may be shared by the cores (e.g., Level 2 (L2 cache)) for high-speed access to data and/or instructions. Data and/or instructions may be transferred (e.g., shared) by writing to and/or reading from the shared memory 510. The local memory 520 of each of the cores 502 and the shared memory 510 may be part of a hierarchy of storage devices including multiple levels of cache memory and the main memory (e.g., the main memory 414, 416 of FIG. 4). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 502 may be referred to as a CPU, DSP, GPU, etc., or any other type of hardware circuitry. Each core 502 includes control unit circuitry 514, arithmetic and logic (AL) circuitry (sometimes referred to as an ALU) 516, a plurality of registers 518, the local memory 520, and a second example bus 522. Other structures may be present. For example, each core 502 may include vector unit circuitry, single instruction multiple data (SIMD) unit circuitry, load/store unit (LSU) circuitry, branch/jump unit circuitry, floating-point unit (FPU) circuitry, etc. The control unit circuitry 514 includes semiconductor-based circuits structured to control (e.g., coordinate) data movement within the corresponding core 502. The AL circuitry 516 includes semiconductor-based circuits structured to perform one or more mathematic and/or logic operations on the data within the corresponding core 502. The AL circuitry 516 of some examples performs integer based operations. In other examples, the AL circuitry 516 also performs floating point operations. In yet other examples, the AL circuitry 516 may include first AL circuitry that performs integer based operations and second AL circuitry that performs floating point operations. In some examples, the AL circuitry 516 may be referred to as an Arithmetic Logic Unit (ALU). The registers 518 are semiconductor-based structures to store data and/or instructions such as results of one or more of the operations performed by the AL circuitry 516 of the corresponding core 502. For example, the registers 518 may include vector register(s). SIMD register(s), general purpose register(s), flag register(s), segment register(s), machine specific register(s), instruction pointer register(s), control register(s), debug register(s), memory management register(s), machine check register(s), etc. The registers 518 may be arranged in a bank as shown in FIG. 5. Alternatively, the registers 518 may be organized in any other arrangement, format, or structure including distributed throughout the core 502 to shorten access time. The second bus 522 may be implemented by at least one of an I2C bus, a SPI bus, a PCI bus, or a PCIe bus Each core 502 and/or, more generally, the microprocessor 500 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 500 is a semiconductor device fabricated to include many transistors interconnected to implement the structures described above in one or more integrated circuits (WCs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 6:
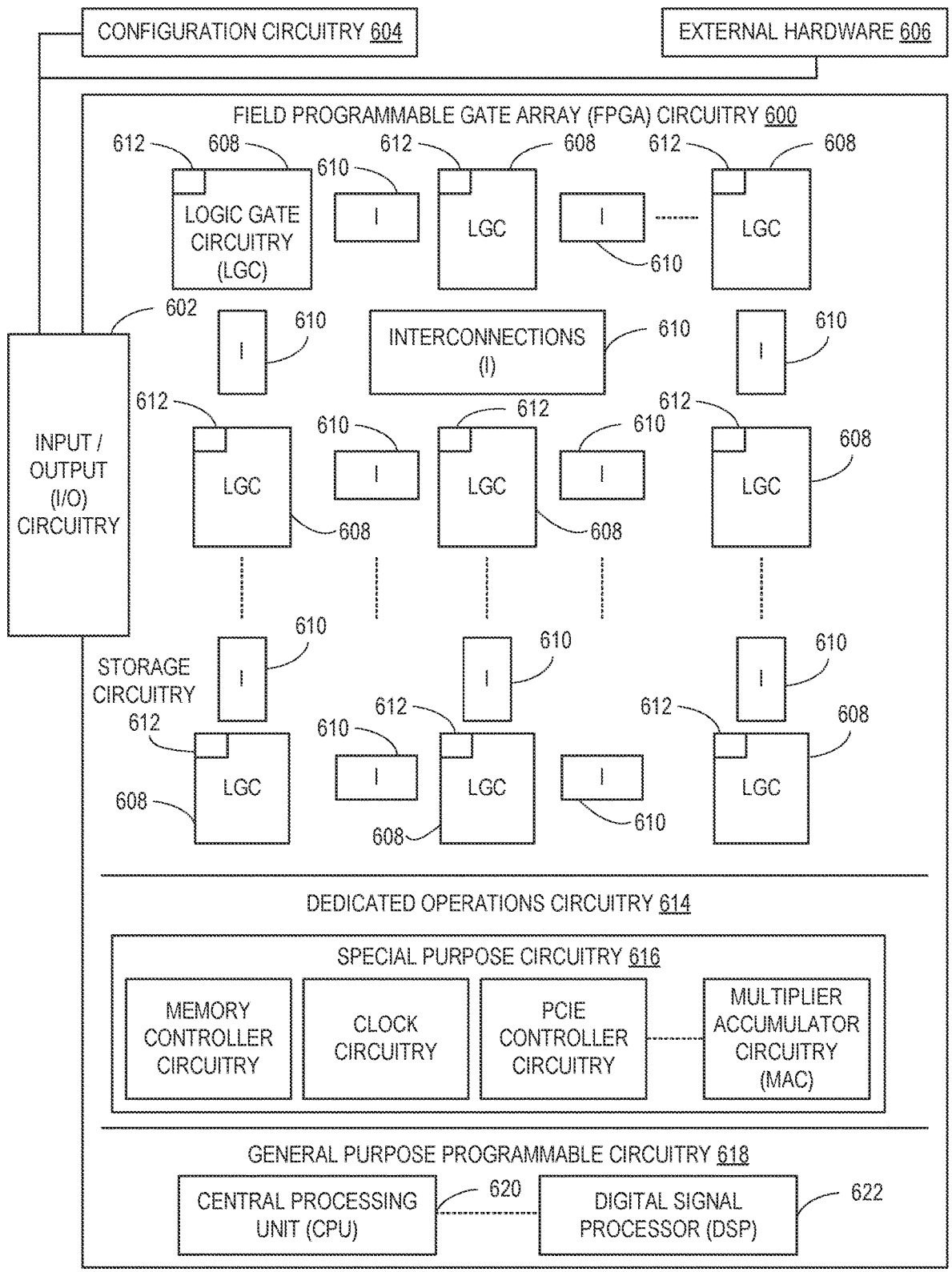
FIG. 6 is a block diagram of another example implementation of the processor circuitry of FIG. 4.

FIG. 6 is a block diagram of another example implementation of the processor circuitry 412 of FIG. 4. In this example, the processor circuitry 412 is implemented by FPGA circuitry 600. For example, the FPGA circuitry 600 may be implemented by an FPGA. The FPGA circuitry 600 can be used, for example, to perform operations that could otherwise be performed by the example microprocessor 500 of FIG. 5 executing corresponding machine readable instructions. However, once configured, the FPGA circuitry 600 instantiates the machine readable instructions in hardware and, thus, can often execute the operations faster than they could be performed by a general purpose microprocessor executing the corresponding software.

More specifically, in contrast to the microprocessor 500 of FIG. 5 described above (which is a general purpose device that may be programmed to execute some or all of the machine readable instructions represented by the flowchart of FIG. 3 but whose interconnections and logic circuitry are fixed once fabricated), the FPGA circuitry 600 of the example of FIG. 6 includes interconnections and logic circuitry that may be configured and/or interconnected in different ways after fabrication to instantiate, for example, some or all of the machine readable instructions represented by the flowchart of FIG. 3. In particular, the FPGA circuitry 600 may be thought of as an array of logic gates, interconnections, and switches. The switches can be programmed to change how the logic gates are interconnected by the interconnections, effectively forming one or more dedicated logic circuits (unless and until the FPGA circuitry 600 is reprogrammed). The configured logic circuits enable the logic gates to cooperate in different ways to perform different operations on data received by input circuitry. Those operations may correspond to some or all of the software represented by the flowchart of FIG. 3. As such, the FPGA circuitry 600 may be structured to effectively instantiate some or all of the machine readable instructions of the flowchart of FIG. 3 as dedicated logic circuits to perform the operations corresponding to those software instructions in a dedicated manner analogous to an ASIC. Therefore, the FPGA circuitry 600 may perform the operations corresponding to the some or all of the machine readable instructions of FIG. 3 faster than the general purpose microprocessor can execute the same.

In the example of FIG. 6, the FPGA circuitry 600 is structured to be programmed (and/or reprogrammed one or more times) by an end user by a hardware description language (HDL) such as Verilog. The FPGA circuitry 600 of FIG. 6, includes example input/output (I/O) circuitry 602 to obtain and/or output data to/from example configuration circuitry 604 and/or external hardware 606. For example, the configuration circuitry 604 may be implemented by interface circuitry that may obtain machine readable instructions to configure the FPGA circuitry 600, or portion(s) thereof. In some such examples, the configuration circuitry 604 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 606 may be implemented by external hardware circuitry. For example, the external hardware 606 may be implemented by the microprocessor 500 of FIG. 5. The FPGA circuitry 600 also includes an array of example logic gate circuitry 608, a plurality of example configurable interconnections 610, and example storage circuitry 612. The logic gate circuitry 608 and the configurable interconnections 610 are configurable to instantiate one or more operations that may correspond to at least some of the machine readable instructions of FIG. 3 and/or other desired operations. The logic gate circuitry 608 shown in FIG. 6 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 608 to enable configuration of the electrical structures and/or the logic gates to form circuits to perform desired operations. The logic gate circuitry 608 may include other electrical structures such as look-up tables (LUTs), registers (e.g., flip-flops or latches), multiplexers, etc.

The configurable interconnections 610 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 608 to program desired logic circuits.

The storage circuitry 612 of the illustrated example is structured to store result(s) of the one or more of the operations performed by corresponding logic gates. The storage circuitry 612 may be implemented by registers or the like. In the illustrated example, the storage circuitry 612 is distributed amongst the logic gate circuitry 608 to facilitate access and increase execution speed.

The example FPGA circuitry 600 of FIG. 6 also includes example Dedicated Operations Circuitry 614. In this example, the Dedicated Operations Circuitry 614 includes special purpose circuitry 616 that may be invoked to implement commonly used functions to avoid the need to program those functions in the field. Examples of such special purpose circuitry 616 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 600 may also include example general purpose programmable circuitry 618 such as an example CPU 620 and/or an example DSP 622. Other general purpose programmable circuitry 618 may additionally or alternatively be present such as a GPU, an XPU, etc., that can be programmed to perform other operations.

Although FIGS. 5 and 6 illustrate two example implementations of the processor circuitry 412 of FIG. 4, many other approaches are contemplated. For example, as mentioned above, modern FPGA circuitry may include an on-board CPU, such as one or more of the example CPU 620 of FIG. 6. Therefore, the processor circuitry 412 of FIG. 4 may additionally be implemented by combining the example microprocessor 500 of FIG. 5 and the example FPGA circuitry 600 of FIG. 6. In some such hybrid examples, a first portion of the machine readable instructions represented by the flowchart of FIG. 3 may be executed by one or more of the cores 502 of FIG. 5, a second portion of the machine readable instructions represented by the flowchart of FIG. 3 may be executed by the FPGA circuitry 600 of FIG. 6, and/or a third portion of the machine readable instructions represented by the flowchart of FIG. 3 may be executed by an ASIC. It should be understood that some or all of the circuitry of FIG. 2 may, thus, be instantiated at the same or different times. Some or all of the circuitry may be instantiated, for example, in one or more threads executing concurrently and/or in series. Moreover, in some examples, some or all of the circuitry of FIG. 2 may be implemented within one or more virtual machines and/or containers executing on the microprocessor.

In some examples, the processor circuitry 412 of FIG. 4 may be in one or more packages. For example, the microprocessor 500 of FIG. 5 and/or the FPGA circuitry 600 of FIG. 6 may be in one or more packages. In some examples, an XPU may be implemented by the processor circuitry 412 of FIG. 4, which may be in one or more packages. For example, the XPU may include a CPU in one package, a DSP in another package, a GPU in yet another package, and an FPGA in still yet another package.

Example methods, apparatus, systems, and articles of manufacture to identify loads lost by vehicles are disclosed herein. Further examples and combinations thereof include the following:

Example 1 includes an apparatus to identify a load lost from a vehicle, the apparatus comprising at least one memory, machine readable instructions, and processor circuitry to at least one of instantiate or execute the machine readable instructions to determine a first load carried by the vehicle at a first time, determine a second load carried by the vehicle at a second time after the first time, identify a lost load occurrence in response to a load difference between the first load and the second load satisfying a lost load threshold, and generate an alert indicative of the lost load occurrence.

Example 2 includes the apparatus of example 1, wherein the vehicle is a first vehicle, wherein the processor circuitry is to determine a lost load location based on an area traversed by the first vehicle between the first time and the second time, and indicate the lost load location to at least one of an operator of the vehicle via a human-machine interface or a second vehicle via vehicle-to-vehicle communication.

Example 3 includes the apparatus of example 1, wherein the processor circuitry is to define the lost load threshold as a percentage of a weight of the vehicle.

Example 4 includes the apparatus of example 1, wherein the vehicle is a first vehicle, the processor circuitry to alert a second vehicle of the lost load occurrence via vehicle-to-vehicle communication.

Example 5 includes the apparatus of example 4, wherein the second vehicle is within a threshold proximity of the first vehicle.

Example 6 includes the apparatus of example 1, further including a camera mounted on the vehicle, wherein the processor circuitry is to identify a structure or a material lost by the vehicle in the lost load occurrence based on data from the camera.

Example 7 includes the apparatus of example 1, wherein the processor circuitry is to route the vehicle to a predetermined location in response to identifying the lost load occurrence.

Example 8 includes the apparatus of example 1, wherein the processor circuitry is to determine the second load in response to gross body motion data associated with the vehicle being within a predetermined gross body motion data range.

Example 9 includes the apparatus of example 8, wherein the predetermined gross body motion data range includes at least one of an acceleration range, a riding surface pitch range, or a vehicle heading range.

Example 10 includes the apparatus of example 1, wherein the processor circuitry is to determine the first load and the second load based on signals from pressure sensors associated with a suspension assembly of the vehicle.

Example 11 includes the apparatus of example 1, wherein the processor circuitry is to determine the first load and the second load based on signals from ride height sensors associated with the vehicle.

Example 12 includes a vehicle comprising at least one of pressure sensors associated with a suspension assembly or ride height sensors, and processor circuitry to execute instructions to determine a first load carried by the vehicle at a first time based on first signals from at least one of the pressure sensors or the ride height sensors, determine a second load carried by the vehicle at a second time later than the first time based on second signals from at least one of the pressure sensors or the ride height sensors, and cause a lost load alert to be presented to an operator of the vehicle in response to the second load being less than the first load by at least a lost load threshold.

Example 13 includes the vehicle of example 12, wherein the processor circuitry is to determine an area traversed by the vehicle between the first time and the second time, and flag the traversed area as a lost load location.

Example 14 includes the vehicle of example 13, wherein the vehicle is a first vehicle, wherein the processor circuitry is to cause transmission of a lost load indication to a second vehicle within a threshold proximity of the lost load location.

Example 15 includes the vehicle of example 14, wherein the processor circuitry is to adjust the lost load location based on a signal from the second vehicle.

Example 16 includes the vehicle of example 12, wherein the vehicle has a first acceleration at the first time and a second acceleration at the second time, the second acceleration within a threshold range of the first acceleration.

Example 17 includes the vehicle of example 12, further including an engine, wherein the processor circuitry is to limit an output of the engine in response to the second load being less the first load by at least the lost load threshold.

Example 18 includes a method comprising determining a difference in a load carried by a first vehicle at a first time and a second time, detecting a lost load occurrence associated with the first vehicle in response to the difference satisfying a threshold, and causing a lost load alert to be presented in the first vehicle.

Example 19 includes the method of example 18, further including causing transmission of the lost load alert to a second vehicle via vehicle-to-vehicle communication.

Example 20 includes the method of example 18, further including determining the load carried by the first vehicle at a third time between the first time and the second time, identifying an area traversed by the first vehicle between the second time and the third time, and flagging the traversed area as a lost load location.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An apparatus to identify a load lost from a vehicle, the apparatus comprising:
    at least one memory;
    machine readable instructions; and
    processor circuitry to at least one of instantiate or execute the machine readable instructions to:
        determine a first load carried by the vehicle at a first time;
        determine a second load carried by the vehicle at a second time after the first time;
        define a lost load threshold as a percentage of a weight of the vehicle;
        identify a lost load occurrence in response to a load difference between the first load and the second load satisfying the lost load threshold; and
        generate an alert indicative of the lost load occurrence.

2. The apparatus of claim 1, wherein the vehicle is a first vehicle, wherein the processor circuitry is to:
    determine a lost load location based on an area traversed by the first vehicle between the first time and the second time; and
    indicate the lost load location to at least one of an operator of the vehicle via a human-machine interface or a second vehicle via vehicle-to-vehicle communication.

3. The apparatus of claim 1, wherein the vehicle is a first vehicle, the processor circuitry to alert a second vehicle of the lost load occurrence via vehicle-to-vehicle communication.

4. The apparatus of claim 3, wherein the second vehicle is within a threshold proximity of the first vehicle.

5. The apparatus of claim 1, further including a camera mounted on the vehicle, wherein the processor circuitry is to identify a structure or a material lost by the vehicle in the lost load occurrence based on data from the camera.

6. The apparatus of claim 1, wherein the processor circuitry is to route the vehicle to a predetermined location in response to identifying the lost load occurrence.

7. The apparatus of claim 1, wherein the processor circuitry is to determine the second load in response to gross body motion data associated with the vehicle being within a predetermined gross body motion data range.

8. The apparatus of claim 7, wherein the predetermined gross body motion data range includes at least one of an acceleration range, a riding surface pitch range, or a vehicle heading range.

9. The apparatus of claim 1, wherein the processor circuitry is to determine the first load and the second load based on signals from pressure sensors associated with a suspension assembly of the vehicle.

10. The apparatus of claim 1, wherein the processor circuitry is to determine the first load and the second load based on signals from ride height sensors associated with the vehicle.

11. A vehicle comprising:
    at least one of pressure sensors associated with a suspension assembly or ride height sensors; and
    processor circuitry to execute instructions to:
        determine a first load carried by the vehicle at a first time based on first signals from at least one of the pressure sensors or the ride height sensors;
        determine, in response to gross body motion data associated with the vehicle being within a predetermined gross body motion data range, a second load carried by the vehicle at a second time later than the first time based on second signals from at least one of the pressure sensors or the ride height sensors; and
        cause a lost load alert to be presented to an operator of the vehicle in response to the second load being less than the first load by at least a lost load threshold.

12. The vehicle of claim 11, wherein the processor circuitry is to:
    determine an area traversed by the vehicle between the first time and the second time; and
    flag the traversed area as a lost load location.

13. The vehicle of claim 12, wherein the vehicle is a first vehicle, wherein the processor circuitry is to cause transmission of a lost load indication to a second vehicle within a threshold proximity of the lost load location.

14. The vehicle of claim 13, wherein the processor circuitry is to adjust the lost load location based on a signal from the second vehicle.

15. The vehicle of claim 11, wherein the vehicle has a first acceleration at the first time and a second acceleration at the second time, the second acceleration within a threshold range of the first acceleration.

16. The vehicle of claim 11, further including an engine, wherein the processor circuitry is to limit an output of the engine in response to the second load being less the first load by at least the lost load threshold.

17. A method comprising:
    determining a difference in a load carried by a first vehicle at a first time and a second time;
    detecting a lost load occurrence associated with the first vehicle in response to the difference satisfying a threshold;
    causing a lost load alert to be presented in the first vehicle;
    determining an area traversed by the first vehicle between the first time and the second time;
    flagging the traversed area as a lost load location;
    causing transmission of the lost load alert to a second vehicle via vehicle-to-vehicle communication, the second vehicle is within a threshold proximity of the first vehicle; and adjusting the lost load location based on a signal from the second vehicle.

18. The method of claim 17, further including:
determining the load carried by the first vehicle at a third time between the first time and the second time;
identifying a portion of the area traversed by the first vehicle between the second time and the third time; and
flagging the traversed area as the lost load location.

\* \* \* \* \*